United States Patent [19]
Li

[11] Patent Number: 5,590,767
[45] Date of Patent: Jan. 7, 1997

[54] CD STORAGE BOX

[76] Inventor: Chin-Chu Li, No. 1-4, Wu Nan Rd., Wu Chi Chen, Taichung Hsien, Taiwan

[21] Appl. No.: 508,922

[22] Filed: Jul. 28, 1995

[51] Int. Cl.⁶ .................................................. B65D 85/57
[52] U.S. Cl. .................................. 206/308.1; 206/307.1; 206/309
[58] Field of Search .............................. 206/308.1, 307, 206/307.1, 309–313

[56] References Cited

U.S. PATENT DOCUMENTS

| | | | |
|---|---|---|---|
| 4,722,034 | 1/1988 | Ackeret | 206/308.1 |
| 5,099,995 | 3/1992 | Karakane et al. | 206/308.1 |
| 5,176,025 | 1/1993 | Cheng | 206/308.1 |
| 5,253,756 | 10/1993 | Goekler | 206/307.1 |
| 5,322,162 | 6/1994 | Melk | 206/311 |
| 5,339,950 | 8/1994 | Li | 206/449 |
| 5,474,170 | 12/1995 | Erickson | 206/308.1 |

Primary Examiner—B. Dayoan
Assistant Examiner—Luan K. Bui
Attorney, Agent, or Firm—Limbach & Limbach

[57] ABSTRACT

A CD storage box including a casing having two opposite rear barrels, a stack of individual CD holders mounted inside the casing having respective barrels turnably connected in series at the same elevation, a cover board having two end lugs respectively and turnably connected to the rear barrels of the casing by a respective locating knob and a barrel connected between the two barrels of the top individual CD holder, and a decorative board slidably mounted on the cover board and having a downward front hook for hooking in a retaining hole on the casing to close the cover board, wherein the decorative board can be extended out of the cover board and used as a sign board when the cover board is opened.

2 Claims, 7 Drawing Sheets

CD STORAGE BOX

BACKGROUND OF THE INVENTION

The present invention relates to CD storage boxes for keeping individual compact disks, and relates more particularly to such a CD storage box which has an extendible cover that can be used as a sign board when opened.

Various individual CD storage boxes have been disclosed for keeping an individual compact disk, and have appeared on the market. However, these individual CD storage boxes can only keep one individual compact disk. When to keep several compact disks, several individual CD storage boxes shall be used. However, it is not an economic way to keep compact disks in this manner.

SUMMARY OF THE INVENTION

The present invention has been accomplished to provide a CD storage box for keeping individual compact disks which eliminates the aforesaid drawbacks. It is one object of the present invention to provide a CD storage box which can keep several pieces of individual compact disks in good order. It is another object of the present invention to provide a CD storage box which has an extendable cover that can be used as a sign board. According to the preferred embodimant of the present invention, the CD storage box comprises a casing having two opposite rear barrels, a stack of individual CD holders mounted inside the casing having respective barrels turnably connected in series at the same elevation, a cover board having two end lugs respectively and turnably connected to the rear barrels of the casing by a respective locating knob and a barrel connected between the two barrels of the top individual CD holder, and a decorative board slidably mounted on the cover board and having a downward front hook for hooking in a retaining hole on the casing to close the cover board, wherein the decorative board can be extended out of the cover board and used as a sign board when the cover board is opened.

DETAILED DESCRIPTION OF THE PREFERRED EMBODIMENT

Figure 1:
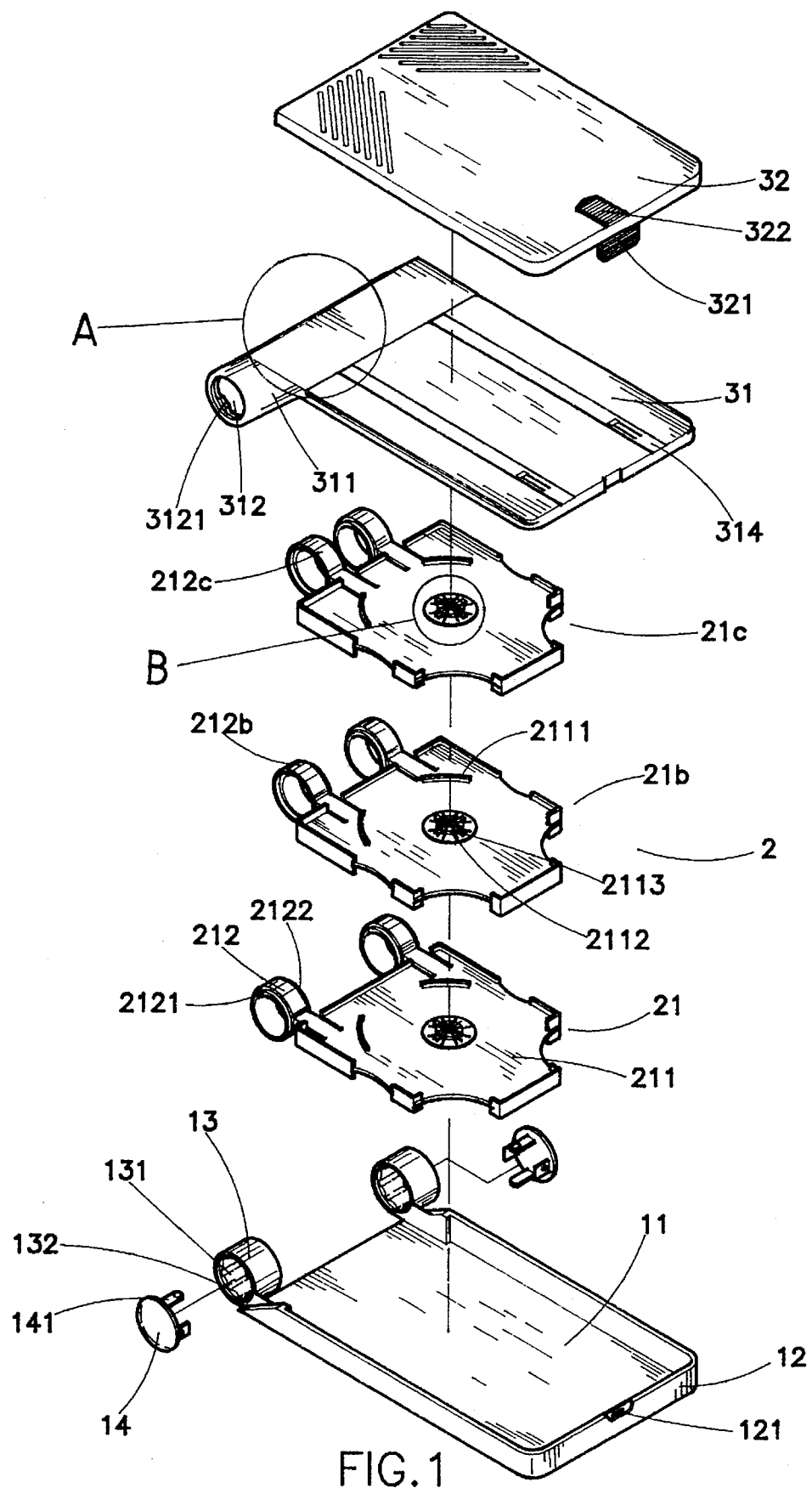
FIG. 1 is an exploded view of a CD storage box according to present invention.
Figure 1B:
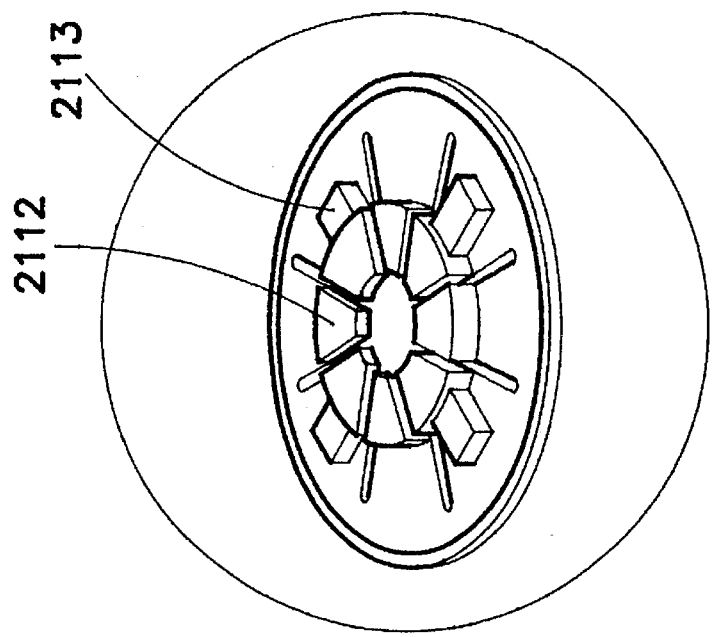
FIG. 1B is an enlarge view taken on part B of FIG. 1.
Figure 1A:
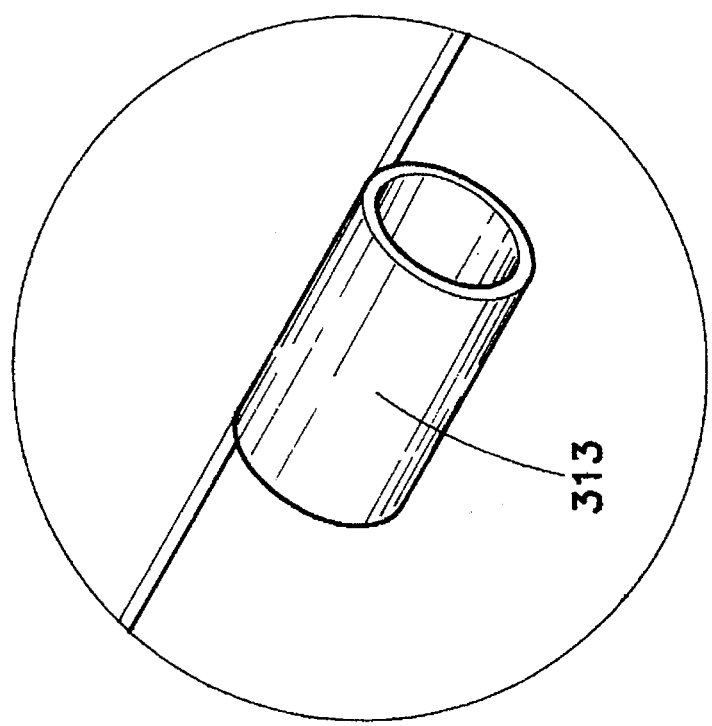
FIG. 1A is an enlarged view of the opposite view taken on part A of FIG. 1.

Referring to FIG. 1, a CD storage box in accordance with the present invention is generally comprised of flat casing 1, a plurality of individual CD holders 2, and a top cover 3. The casing 1 comprises a storage chamber 11, two barrels 13 bilaterally disposed at the open rear end, an upright front wall 12 transversely disposed at the front end, and a retaining hole 121 in the middle of the upright front wall 12, wherein each barrel 13 has a plurality of longitudinal grooves 132 on the inside wall 131 for mounting a respective locating knob 14, which has a plurality of locating legs 141 respectively fitted into the longitudinal grooves 132. The individual CD holder 2 comprises a flat holder frame 21 (21b, 21c, etc.) defining a CD seat 211, a hub 2112 with radial projections 2113 at the center of the CD seat 211 for holding an individual CD, and two barrels 212 (212b, 212c, etc.) disposed at the rear end, each barrel 212 has an annular coupling flange 2121 and an annular coupling groove 2122. The barrels 212, 212b, 212c of the holder frames 21, 21b, 21c of the CD holders 2 are made at different locations such that the barrels 212c or 212b of an upper CD holder can be connected between the barrels 212b or 212 of a lower CD holder. The top cover 3 comprises a cover board 31 and a decorative board 32. The cover board 31 comprises two end lugs 311 bilaterally disposed at the rear end and respectively connected to the barrels 13 of the casing 1 by a respective locating knob 14, each lug 311 having a stop block 3121 raised from the inside wall 312 for positioning, a barrel 313 spaced between the lugs 311 and connected between the barrels 212c on the holder frame 21c of one CD holder 2, and a plurality of longitudinal sliding grooves 314 at the top side for mounting the decorative board 32. The decorative board 32 is slidably mounted on the cover board 31, having a downward front hook 321 for hooking in the retaining hole 121 on the casing 1, a finger knob 322 above the downward front hook 321 for moving by finger, and a plurality of longitudinal rails (not shown) moved in the longitudinal grooves 314 on the cover board 3.

Figure 2:
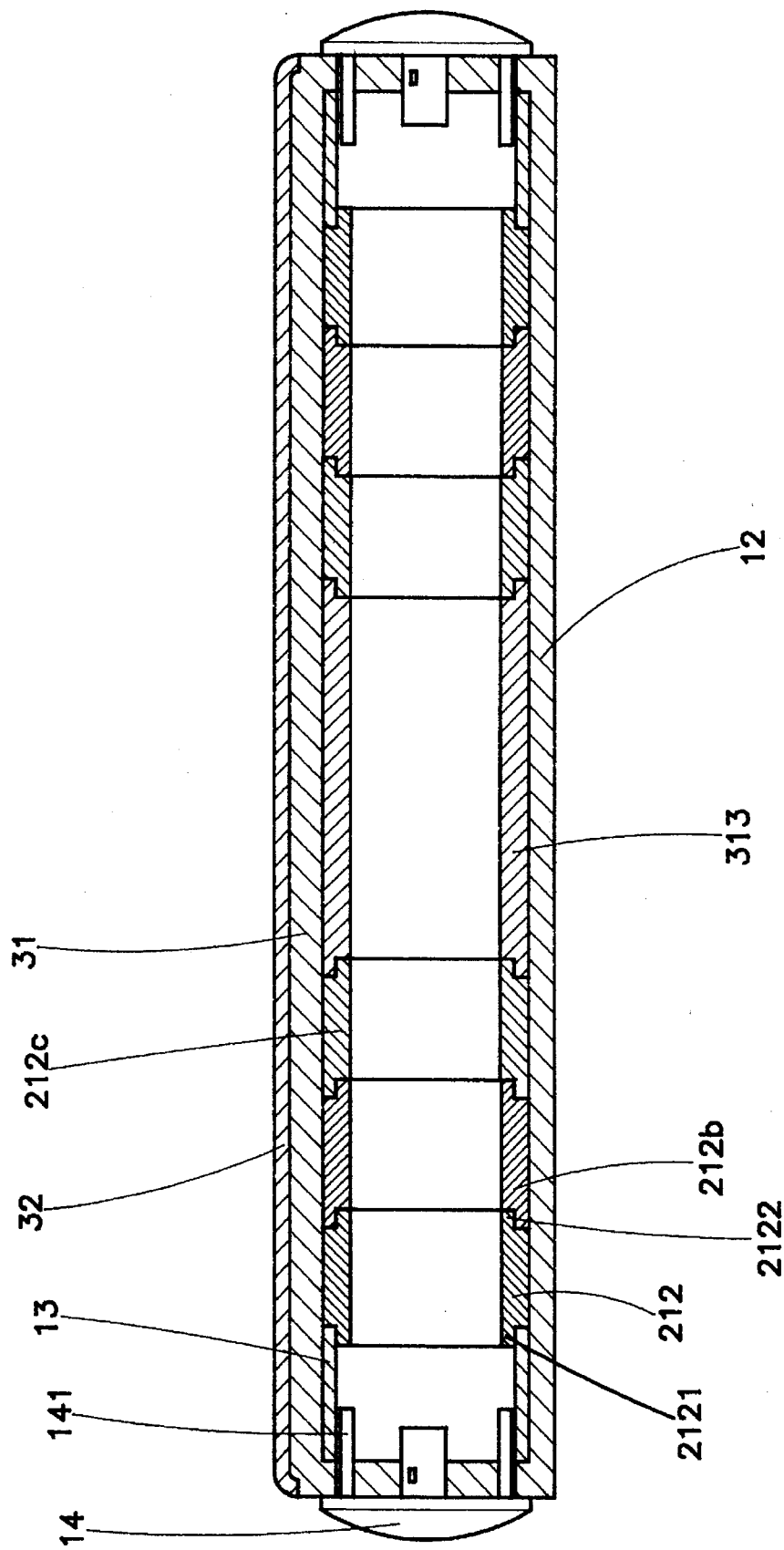
FIG. 2 is an end view in section of the CD storage box shown in FIG. 1, showing the barrels of the individual CD holder connected between the barrels of the casing.
Figure 3:
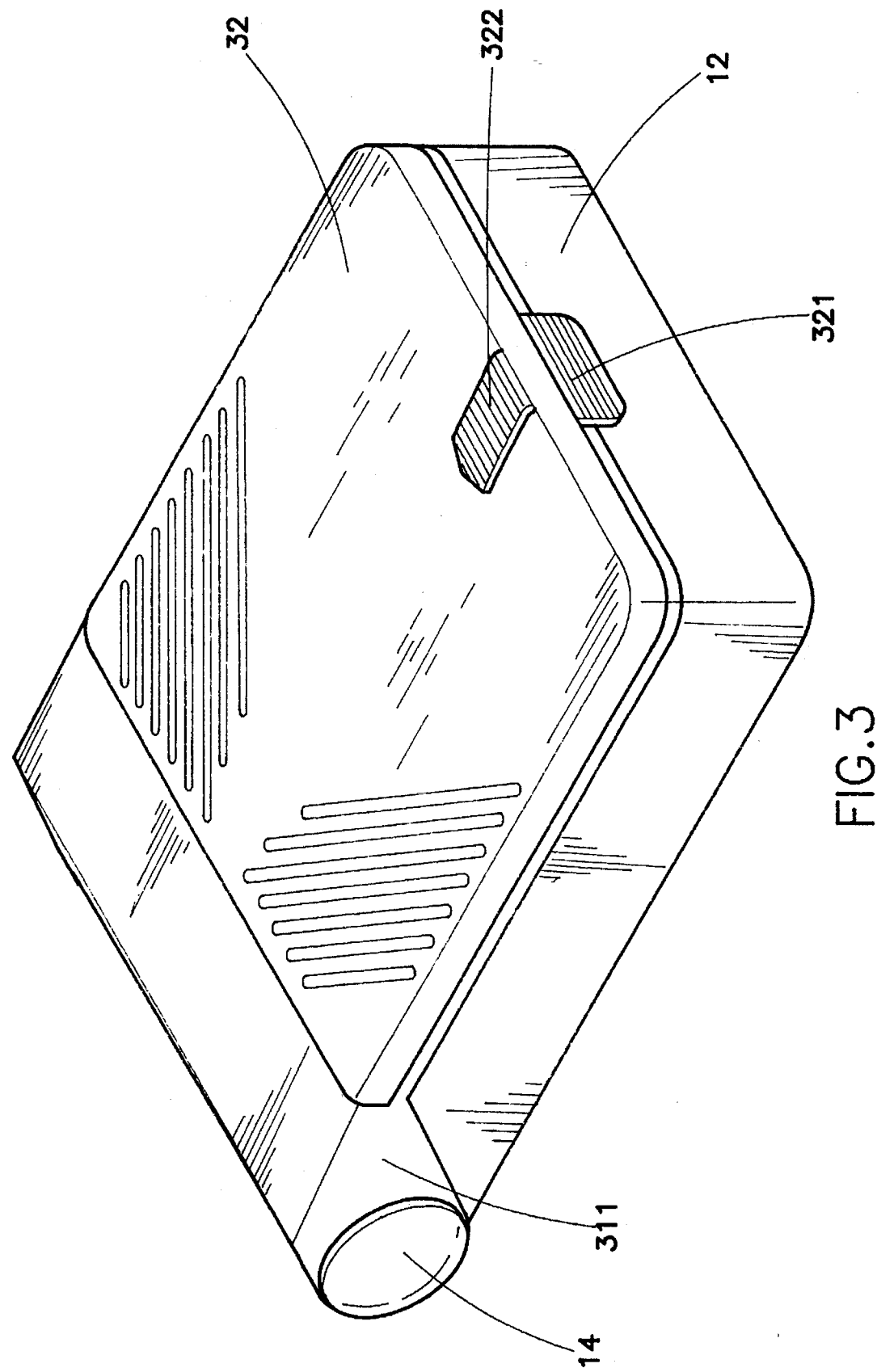
FIG. 3 is an elevational view of the CD storage box shown in FIG. 1, showing the cover closed.
Figure 4:
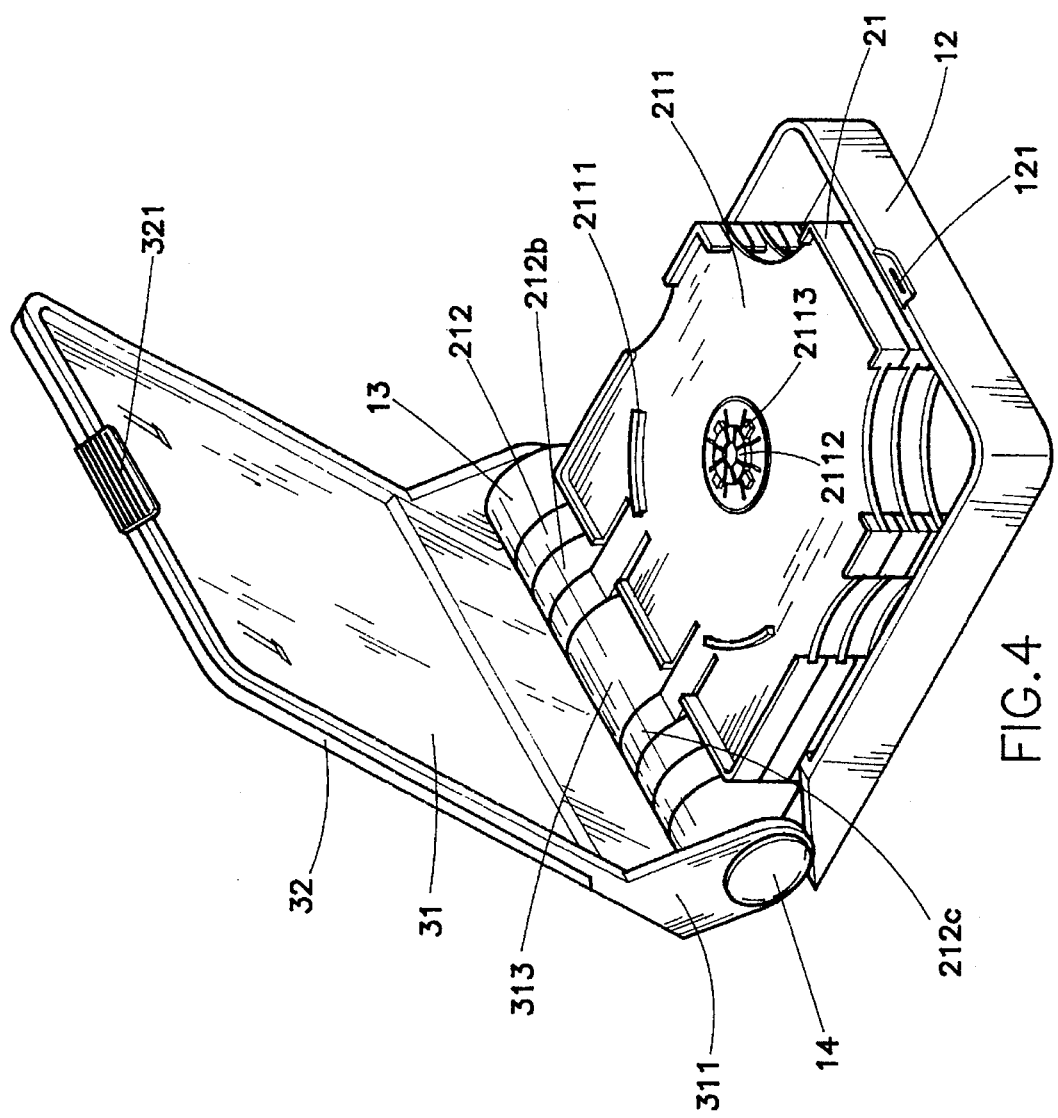
FIG. 4 is an elevational view of the CD storage box shown in FIG. 1, showing the cover opened.

Referring to FIGS. 2, 3, and 4, when the CD holders 2 are arranged in a stake and mounted within the storage chamber 11 of the casing 1, the barrels 212, 212b, 212c are connected in series by: fitting the annular coupling flanges 2121 of one CD holder into the annular coupling grooves 2122 of another CD holder and fitting the annular coupling flanges 2121 of the bottom CD holder into the barrels 13 of the casing 1. Then, the cover board 31 is pivotably connected to the casing 1 by: connecting the barrel 313 between the barrels 212c of the top CD holder and fastening the lugs 311 to the barrels 13 of the casing 1 by a respective locating knob 14. When the cover board 31 is installed, the decorative board 32 is fastened to the cover board 31 by fitting the longitudinal rails of the decorative board 32 into the longitudinal sliding grooves 314 of the cover board 31. When assembled, the cover 3 and the individual CD holders 2 can be lifted from the casing 12, and the cover 3 can be stopped in an open position by engaging the stop block 3121 with the locating legs 141.

Figure 5:
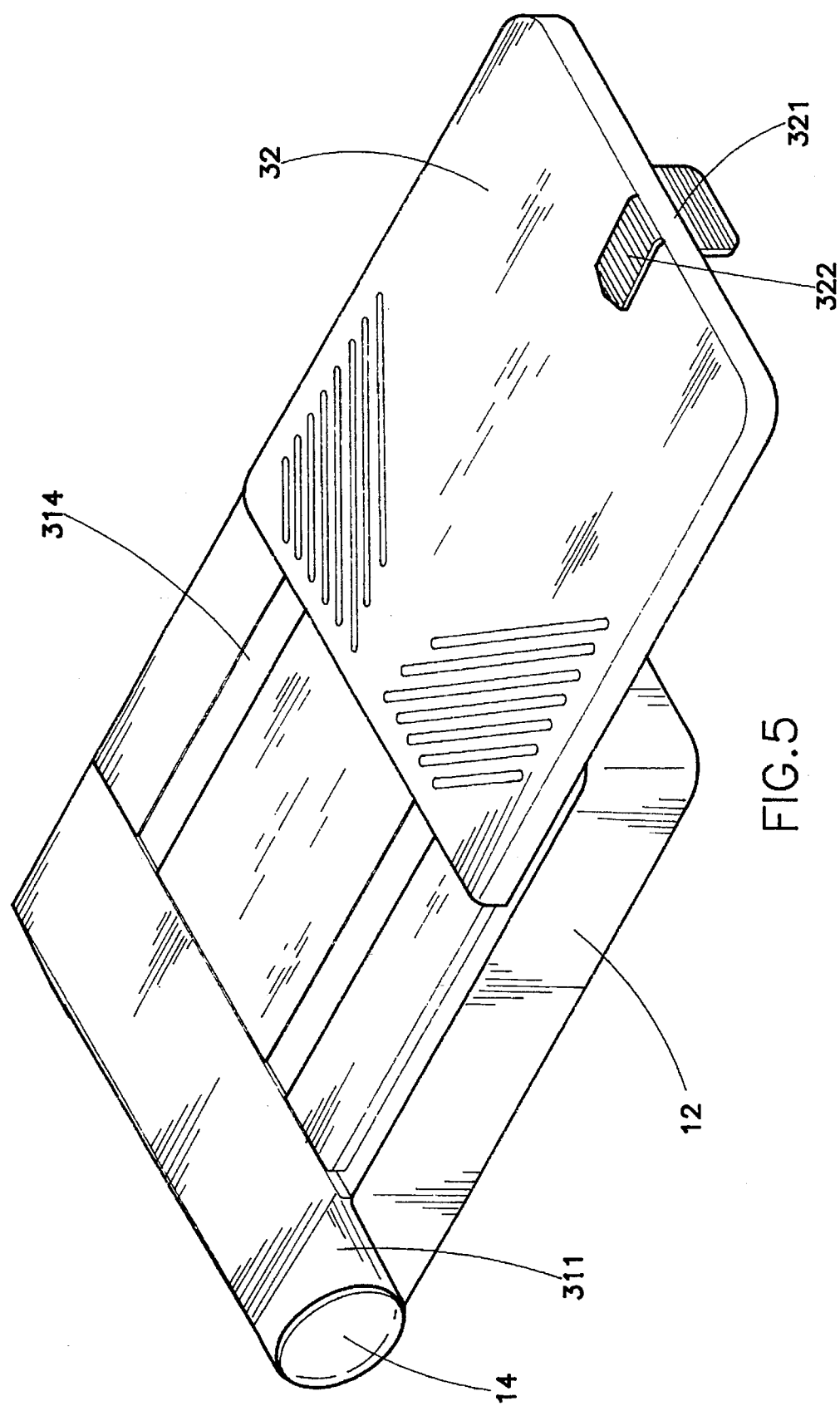
FIG. 5 is similar to FIG. 3 but showing the decorative board extended out of the cover board.
Figure 6:
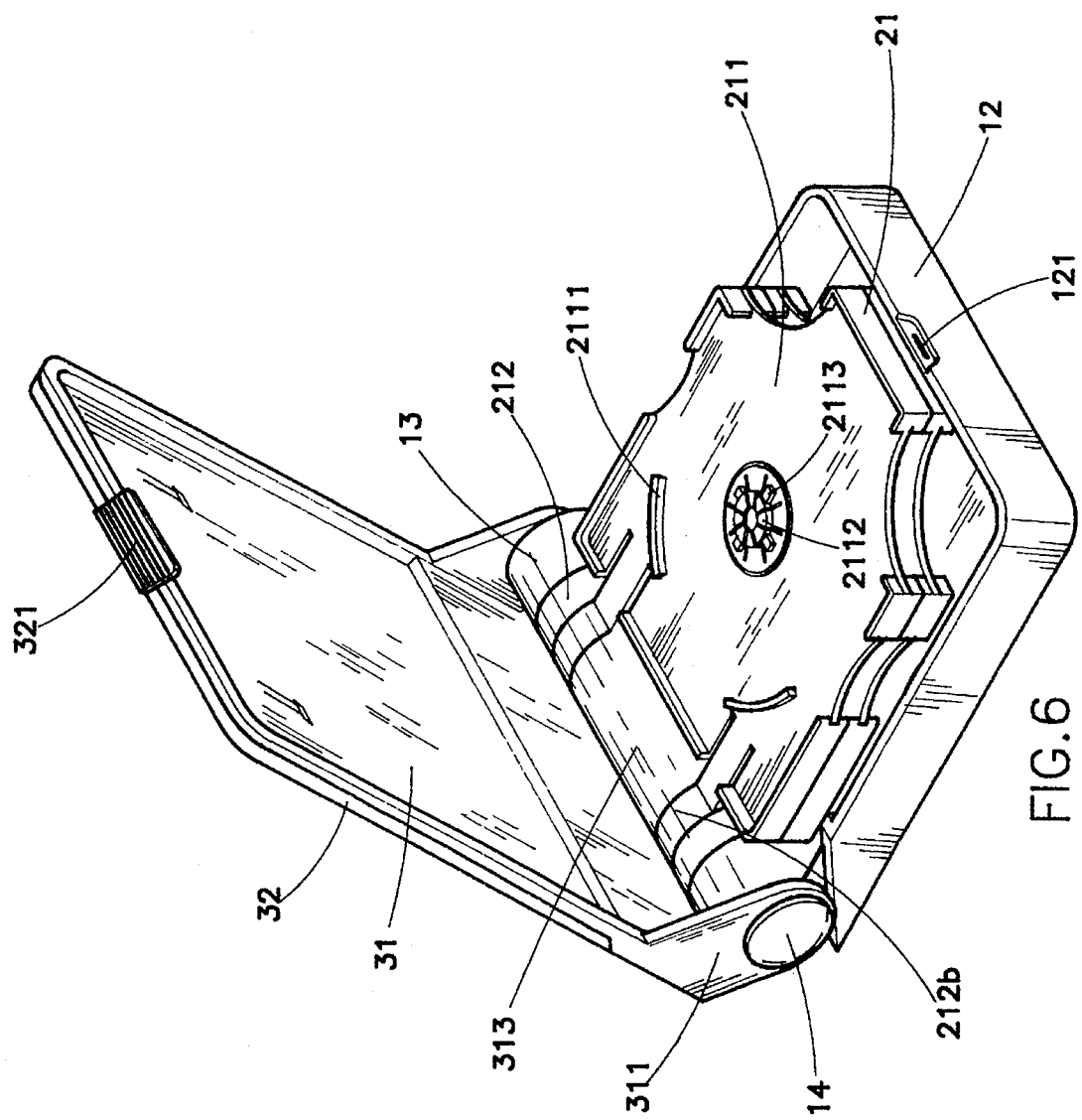
FIG. 6 is an applied view of the present invention.

Referring to FIG. 5, the decorative board 32 can be extended out of the cover board 31 and used as a sign board.

While only one embodiment of the present invention has been shown and described, it will be understood that various modifications and changes could be made without departing from the spirit and scope of the invention disclosed.

I claim:

1. A CD storage box comprising:

a flat casing having a top storage chamber, a rear open end, two opposite barrels at said rear open end, a front close end, a retaining hole on said front close end, each barrel of said flat casing having a plurality of longitudinal grooves;

a stack of individual CD holders received in said top storage chamber of said flat casing, each individual CD holder having two barrels spaced at one end, a CD seat, a hub raised from said CD seat for holding an individual CD in said CD seat, each barrel of said individual CD holders having an annular coupling flange and an annular coupling groove, the barrels of said individual CD holders being turnably connected in series by fitting the respective annular coupling flanges into the respective annular coupling grooves;

a cover pivotably connected to said casing and covering said individual CD holders, said cover comprising two end lugs respectively, turnably connected to the barrels of said casing, a barrel spaced between said end lugs and connected between the barrels of one individual CD holder, and a downward hook for hooking in the retaining hole on the front close end of said casing; and two locating knobs respectively fastened to the barrels of said casing to secure the end lugs of said cover to said casing, each locating knob having a plurality of locating legs respectively inserted through the end lugs of said cover into the longitudinal grooves of the barrels of said casing.

2. The CD storage box of claim 1, wherein said cover comprises a cover board pivotably fastened to said casing by said locating knobs, and a decorative board slidably mounted on said cover board, said cover board having a flat top wall and a plurality of longitudinal sliding grooves on said flat top wall, said decorative board having a plurality of longitudinal rails respectively slidably connected to the longitudinal sliding grooves of said cover board.

* * * * *